United States Patent
Kim et al.

(10) Patent No.: US 9,660,291 B2
(45) Date of Patent: May 23, 2017

(54) POSITIVE ACTIVE MATERIAL FOR LITHIUM SECONDARY BATTERY, METHOD OF PREPARING THE SAME, AND LITHIUM SECONDARY BATTERY INCLUDING POSITIVE ACTIVE MATERIAL

(75) Inventors: Min-Han Kim, Yongin-si (KR); Do-Hyung Park, Yongin-si (KR); Ji-Hyun Kim, Yongin-si (KR); Jeong-Seop Lee, Yongin-si (KR); Chang-Hyuk Kim, Yongin-si (KR); Seon-Young Kwon, Yongin-si (KR); Yoon-Chang Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/569,386

(22) Filed: Aug. 8, 2012

(65) Prior Publication Data

US 2013/0149608 A1 Jun. 13, 2013

(30) Foreign Application Priority Data

Dec. 7, 2011 (KR) ........................ 10-2011-0130471

(51) Int. Cl.
*H01M 4/131* (2010.01)
*H01M 10/0525* (2010.01)
*H01M 4/04* (2006.01)
*H01M 4/36* (2006.01)
*H01M 4/505* (2010.01)
(Continued)

(52) U.S. Cl.
CPC ...... *H01M 10/0525* (2013.01); *C01G 53/006* (2013.01); *C01G 53/50* (2013.01); *H01M 4/0497* (2013.01); *H01M 4/366* (2013.01); *H01M 4/505* (2013.01); *H01M 4/525* (2013.01); *C01P 2002/88* (2013.01); *C01P 2004/03* (2013.01); *C01P 2004/61* (2013.01);
(Continued)

(58) Field of Classification Search
USPC .......................................... 429/220, 223, 224
See application file for complete search history.

(56) References Cited

U.S. PATENT DOCUMENTS 6,241,959 B1   6/2001 Cho et al.
6,921,609 B2 *  7/2005 Lampe-Onnerud et al. . 429/223
(Continued)

FOREIGN PATENT DOCUMENTS

CN      101622741     1/2010
JP      2000-149942 A  5/2000
(Continued)

OTHER PUBLICATIONS

YK Sun et al., High-energy cathode material for long-life and safe lithium batteries, Nature Materials, vol. 8, pp. 320-324, Mar. 22, 2009.*

(Continued)

*Primary Examiner* — Ula C Ruddock
*Assistant Examiner* — Osei Amponsah
(74) *Attorney, Agent, or Firm* — Robert E. Bushnell, Esq.

(57) ABSTRACT

A positive active material for a lithium secondary battery, a method of preparing the same, and a lithium secondary battery including the positive active material. The positive active material includes a core part and a shell part that include a nickel-based composite oxide, and a content of nickel in the core part is larger than that in the shell part.

10 Claims, 6 Drawing Sheets

(51) Int. Cl.
*H01M 4/525* (2010.01)
*C01G 53/00* (2006.01)
*H01M 4/02* (2006.01)

(52) U.S. Cl.
CPC ...... *C01P 2004/84* (2013.01); *C01P 2006/40* (2013.01); *H01M 2004/021* (2013.01)

(56) References Cited

U.S. PATENT DOCUMENTS

| | | | |
|---|---|---|---|
| 7,763,386 B2 * | 7/2010 | Hosoya et al. | 429/231.1 |
| 2001/0028874 A1 | 10/2001 | Cho et al. | |
| 2001/0044050 A1 * | 11/2001 | Hayashi | H01M 4/32 429/223 |
| 2003/0134200 A1 | 7/2003 | Tanaka et al. | |
| 2004/0234857 A1 | 11/2004 | Shiozaki et al. | |
| 2008/0090150 A1 | 4/2008 | Nakura | |
| 2008/0160410 A1 | 7/2008 | Sun et al. | |
| 2008/0193841 A1 | 8/2008 | Sun et al. | |
| 2008/0193846 A1 | 8/2008 | Morishima | |
| 2008/0268339 A1 | 10/2008 | Suzuki | |
| 2009/0068561 A1 | 3/2009 | Sun et al. | |
| 2009/0286155 A1 * | 11/2009 | Takehara | C01B 25/455 429/199 |
| 2010/0099027 A1 * | 4/2010 | Kikuya | H01M 4/366 429/223 |
| 2011/0027651 A1 * | 2/2011 | Sun et al. | 429/220 |
| 2011/0050178 A1 | 3/2011 | Kim et al. | |
| 2011/0305954 A1 | 12/2011 | Kim et al. | |
| 2012/0009476 A1 * | 1/2012 | Park | H01M 4/131 429/223 |
| 2012/0270107 A1 | 10/2012 | Toya et al. | |

FOREIGN PATENT DOCUMENTS

| | | |
|---|---|---|
| JP | 4100785 B2 | 3/2008 |
| JP | 2008-521196 | 6/2008 |
| JP | 4317571 B | 5/2009 |
| JP | 2009-525578 | 7/2009 |
| KR | 10-0674287 B | 1/2007 |
| KR | 10-0725399 B | 6/2007 |
| KR | 10-2008-0075775 | 8/2008 |
| KR | 10-2009-0082790 A | 7/2009 |
| WO | 2011067935 A1 | 6/2011 |

OTHER PUBLICATIONS

Yang-Kook Sun et al, "High-energy cathide material for long-life and safe lithium batteries", Nature Materials, Mar. 22, 2009, pp. 320-324, Macmillan Publishers Limited.

Yang-Kook Sun et al, "A Novel Cathode Material with a Concentration-Gradient for High-Energy and Safe Lithium-Ion Batteries", Advanced Functional Materials, Sep. 14, 2009, pp. 485-491, Wiley-VCH Verlag GmbH & Co.

M.-H. Lee et al, "Synthetic optimization of Li[Ni1/3Co1/3Mn1/3]O2 via co-precipitation", Electrochimica Acta, Sep. 11, 2004, pp. 939-948, vol. 50, Elsevier Ltd.

European Search Report issued on Mar. 2, 2015 by EPO in connection with European Patent Application No. 12196102.3 which also claims Korean Patent Application No. KR10-2011-0130471 as its priority document.

Chinese Office Action issued by SIPO on Dec. 16, 2015 in connection with Chinese Application No. 201210523903.9.

EPO Examination Report issued by the European Patent Office on Dec. 22, 2015 in connection with European Patent Application No. 12 196 102.3.

Japanese Office Action issued by JPO on Oct. 18, 2016 in corresponding Japanese Patent Application No. 2012-265252 which also claims Korean Patent Application No. 10-2011-0130471 as its priority application, together with Request for Entry of the Accompanying Office Action attached herewith.

Chinese Office Action issued by SIPO on Aug. 9, 2016 in corresponding Chinese Patent Application No. 201210523903.9 which also claims Korean Patent Application No. 10-2011-0130471 as its priority application, together with its English translation.

Korean Registration Determination Certificate issued by KIPO on Nov. 30, 2016 in corresponding Korean Patent Application No. 10-2011-0130471, together with Request for Entry attached herewith.

KR Office Action issued by the Korean Intellectual Property Office on May 3, 2016 in the examination of Korean Patent Application No. 10-2011-0130471 which corresponds to this US Application. Request for Entry of the Accompanying Office Action is attached herewith.

* cited by examiner

POSITIVE ACTIVE MATERIAL FOR LITHIUM SECONDARY BATTERY, METHOD OF PREPARING THE SAME, AND LITHIUM SECONDARY BATTERY INCLUDING POSITIVE ACTIVE MATERIAL

CLAIM OF PRIORITY

This application makes reference to, incorporates the same herein, and claims all benefits accruing under 35 U.S.C. §119 from an application earlier filed in the Korean Intellectual Property Office on the 7 of Dec. 2011 and there duly assigned Serial No. 10-2011-0130471.

BACKGROUND OF THE INVENTION

Field of the Invention

One or more embodiments of the present invention relate to a positive active material for a lithium secondary battery, a method of preparing the same, and a lithium secondary battery including the positive active material.

Description of the Related Art

Representative rechargeable secondary batteries are lead-acid batteries, nickel hydrogen batteries, lithium secondary batteries, and the like. In particular, lithium secondary batteries have no memory effect in which they may lose energy capacity if charged when not fully discharged, have a high energy density per unit weight because Li is the lightest of all metals, have an electromotive force of 3.6 V, which is three times greater than that of nickel-based batteries, and are easily miniaturized. Due to these characteristics, lithium secondary batteries are widely used in mobile products, notebooks, electric tools, and the like, and are also expected to be used in hybrid electric vehicles (HEVs) in the future.

A lithium secondary battery includes a positive electrode, a negative electrode, a separator, and an electrolyte. When the lithium secondary battery is charged, lithium ions are deintercalated from the positive electrode and then move to the negative electrode. On the other hand, when the lithium secondary battery is discharged, lithium ions are deintercalated from the negative electrode and return to the positive electrode, in this regard, the electrodes or the electrolyte do or does not undergo a chemical reaction.

Currently, a lithium cobalt oxide, i.e., $LiCoO_2$ (hereinafter, referred to as "LCO") is used most widely as a positive active material of a lithium secondary battery. However, due to local distribution and scarcity of cobalt resources, manufacturing costs increase and a stable supply of the cobalt resources is difficult. To address these problems, research into a material for replacing the cobalt material has been actively conducted. A nickel-based composite oxide, such as nickel-manganese-cobalt (NMC), is a candidate material that overcomes the limitations, such as costs, stability, capacity, and the like, of materials, such as LCO, LNO ($LiNiO_2$), or LMO($Li_2MnO_3$), and research into the candidate material has recently been conducted actively.

However, known nickel-based composite oxides have no satisfactory capacity and stability and thus there is still room for improvement.

SUMMARY OF THE INVENTION

One or more embodiments of the present invention include an improved positive active material.

One or more embodiments of the present invention include a positive active material for a lithium secondary battery that has a high capacity and packing density and is thermally stable.

One or more embodiments of the present invention include a method of preparing the same.

One or more embodiments of the present invention include a lithium secondary battery including the positive active material.

One or more embodiments of the present invention include a precursor of the positive active material.

Additional aspects will be set forth in part in the description which follows and, in part, to will be apparent from the description, or may be learned by practice of the presented embodiments.

According to one or more embodiments of the present invention, a positive active material for a lithium secondary battery includes a core part and a shell part that both include a nickel-based composite oxide represented by Formula 1 below:

$$Li_a[Ni_xCo_yMn_z]O_2 \qquad \text{<Formula 1>}$$

wherein 0.8≤a≤1.2, 0.05≤x≤0.9, 0.1≤y≤0.8, 0.1≤z≤0.8, and x+y+z=1. A content of nickel in the core part is larger than that in the shell part, and the core part comprises needle-like particles.

According to one or more embodiments of the present invention, a method of preparing a positive active material for a lithium secondary battery includes a first process for mixing a first precursor solution comprising a nickel salt, a cobalt salt, and a manganese salt and a first base to prepare a first mixture and inducing a reaction in the first mixture to obtain a precipitate, a second process for adding to the precipitate a second precursor solution comprising a nickel salt, a cobalt salt, and a manganese salt and a second base to obtain a second mixture and inducing a reaction in the second mixture to obtain a composite metal hydroxide, and mixing the composite metal hydroxide with a lithium salt and heat treating the mixed composite metal hydroxide to prepare the positive active material. A content of nickel in the first precursor solution is adjusted to be larger than that in the second precursor solution.

According to one or more embodiments of the present invention, a lithium secondary battery includes the positive active material.

According to one or more embodiments of the present invention, a positive active material precursor for a lithium secondary battery includes a nickel-based composite hydroxide represented by Formula 2 below and needle-like particles:

$$Ni_xCo_yMn_zOH \qquad \text{<Formula 2>}$$

wherein 0.05≤x≤0.9, 0.1≤y≤8, 0.1≤z≤0.8, and x+y+z=1.

The core part precursor has open pores and a curved, surface structure.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
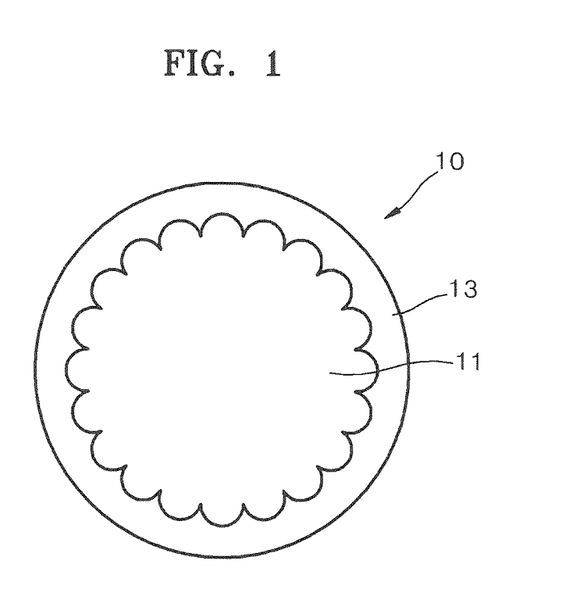
FIG. 1 is a schematic cross-sectional view of a positive active material of a lithium secondary battery constructed as an embodiment according to the principles of the present invention.

FIG. 1. is a schematic cross-sectional view of a positive active material 10 of a lithium secondary battery, constructed as an embodiment according to the principles of the present invention. Referring to FIG. 1, the positive active material 10 of a lithium secondary battery has a two-layered structure consisting of a core part 11 and a shell part 13.

Although not illustrated in FIG. 1, the core part and/or the positive active material including the core part and the shell part are composed of needle-like particles. The presence of the needle-like particles may be confirmed by a scanning electron microscope.

Referring to FIG. 1, the core part 11 may have a curved surface or a non-curved surface.

As illustrated in FIG. 1, the shell part 13 covers the core part 11.

The core part 11 and the shell part 13 both include a nickel-based composite oxide represented by Formula 1 below:

$$Li_a[Ni_xCo_yMn_z]O_2 \quad \text{<Formula 1>}$$

wherein $0.8 \le a \le 1.2$, $0.1 \le z \le 0.8$, and $x+i+y+z=1$.

The amounts of the core part 11 and the shell part 13 may be in the range of approximately 40-90 parts by weight and approximately 10-60 parts by weight, respectively, based on 100 parts by weight of the positive active material 10.

The core part 11 includes a larger amount of nickel than the shell part 13. The amount of nickel in the core part 11 may be in a broad range of approximately 50-90 mole %, and in other implements of the principles of the invention, may be in the range of approximately 60-90 mole %, and the amount of nickel in the shell part 13 may be in the range of approximately 5-49 mole %. In one embodiment, the amount of nickel in the core part 11 may be in the range of approximately 60-80 mole %, and the amount of nickel in the shell part 13 may be approximately 45-55 mole %.

The core part 11 of the positive active material 10 that contains a relatively large amount of nickel may contribute to an increase in the capacity of a lithium secondary battery, and the shell part 13 of the positive active material 10 that contains a relatively low amount of nickel may contribute to an increase in the stability of a lithium secondary battery. Since the shell part 13 in contact with an electrolyte has a small amount of nickel, deterioration of thermal stability, which is caused by a reaction between the shell part 13 and the electrolytic solution, may be prevented.

The core part 11 has a porous structure with open pores and thus the contact area between the core part 11 and the shell part 13 increases, whereby the core part 11 and the shell part 13 are not completely disconnected. The increases of contact area between the core part 11 and the shell part 13 and the existence of the core part 11 that has a surface similar to a surface of active particles may more largely contribute to an increase in the capacity of a lithium secondary battery, as compared to conventional active particles in which a core part is completely disconnected from a shell part.

In one embodiment, the core part 11 or a precursor of the core part 11 may have open pores and a curved surface structure.

In one embodiment, the shell part 13 may have portions that permeate into the open pores of the core part 11.

A positive active material precursor for a lithium secondary battery, according to an embodiment of the present invention, includes a nickel-based composite hydroxide represented by Formula 2 below:

$$Ni_xCo_yMn_zOH \quad \text{<Formula 2>}$$

wherein $0.05 \le x \le 0.9$, $0.1 \le y \le 0.8$, $0.1 \le z \le 0.8$, and $x+y+z=1$.

The positive active material precursor may be a precursor of the core part 11.

The term "open pore" used herein refers to a pore structure with a channel, in which when a shell part is formed on a core part, the inside of the core part may be filled by the shell part.

The diameter of the core part 11 may be in the range of approximately 1 μm to 10 μm, and the diameter of the shell part 13 may be in the range of approximately 5 μm to 20 μm.

When the diameters of the core part 11 and the shell part 13 are within the ranges described above, the positive active material has excellent capacity characteristics. That is, a positive active material with high capacity and stability may be obtained.

In the positive active material, for example, the core part 11 may include $LiNi_{0.6}Co_{0.2}Mn_{0.2}O_2$ and the shell part 13 may include $LiNi_{0.33}Co_{0.33}Mn_{0.33}O_2$.

Figure 7:
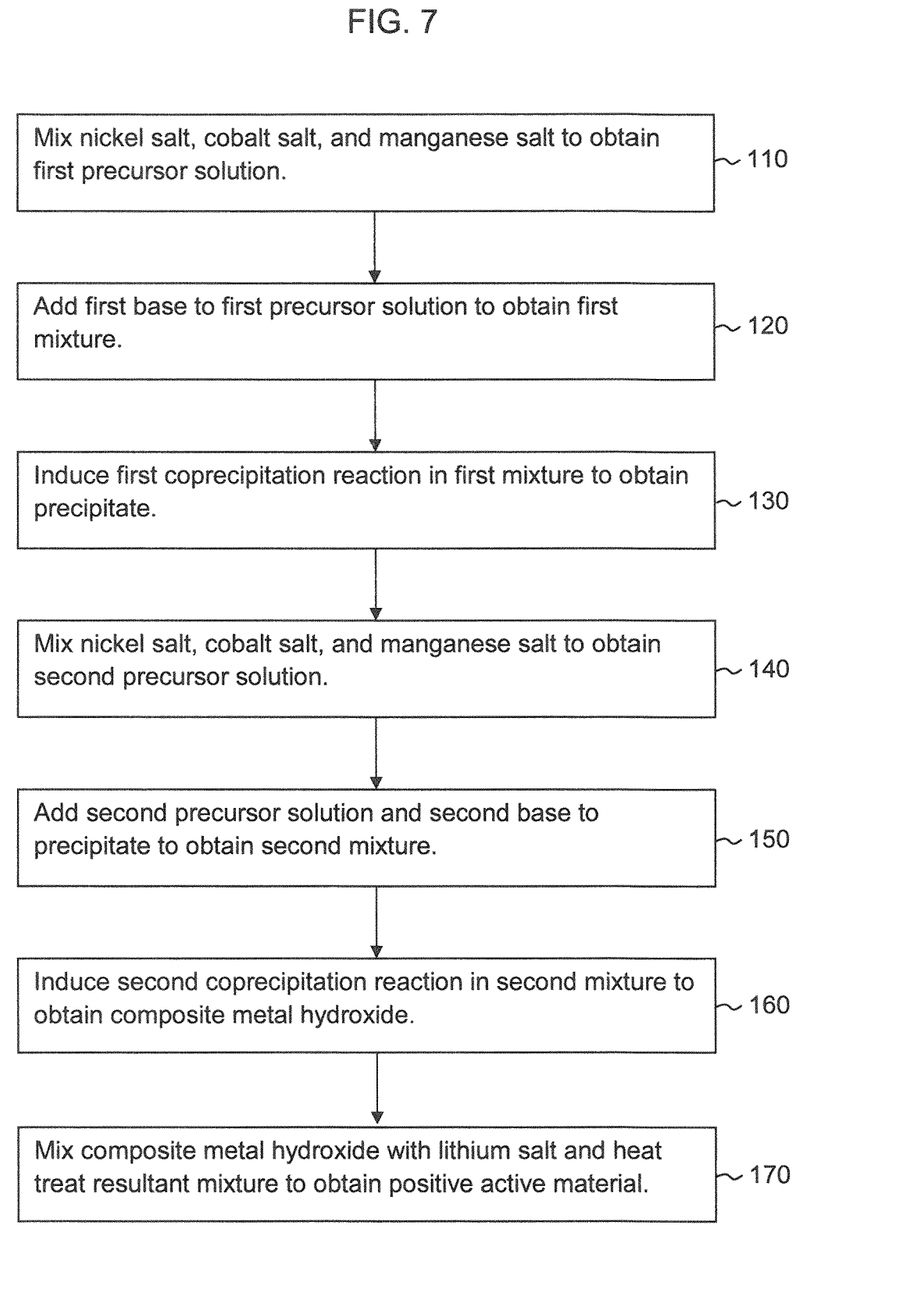
FIG. 7 is a flow chart illustrating a method of preparing a positive active material for a lithium secondary battery as an embodiment according to the principles of the present invention.

According to another embodiment of the present invention, there is provided a method of preparing the positive active material for a lithium secondary battery. FIG. 7 is a flow chart illustrating a method of preparing a positive active material for a lithium secondary battery as an embodiment according to the principles of the present invention.

The positive active material may be prepared by coprecipitation. The coprecipitation is a method whereby at least two types of elements or compounds are co-precipitated using a precipitation reaction in an aqueous solution, thereby preparing powder.

To obtain the nickel-based composite oxide of Formula 1, a nickel salt, a cobalt salt, and a manganese salt are mixed at a molar ratio of x:y:z satisfying $0.05 \le x \le 0.9$, $0.1 \le y \le 0.8$, $0.1 \leq z \leq 0.8$, and $x+y+z=1$ to prepare a first precursor solution (step 110). A first base is added to the first precursor solution and mixed together to obtain a first mixture (step 120).

While the pH of the first mixture is maintained basic, a first coprecipitation reaction in the first mixture is induced to co-precipitate nickel ions, cobalt ions, and manganese ions. As a result, a precipitate is obtained as a core part precursor (step 130).

The pH of the first mixture is adjusted to be approximately 10 to 11, and the reaction of the first mixture is performed at a temperature ranging from about 25 to about 35° C. In addition, a flow rate of $N_2$ is maintained at approximately 1 LPM, and an average reaction time is adjusted to be approximately 5 to 7 hours.

In the first mixture, the first base is added so as to adjust the pH of the first mixture within the range described above.

The precipitate includes a nickel-based composite hydroxide represented by Formula 2 above and may be a positive active material precursor for a lithium secondary battery which is formed of needle-like particles:

The positive active material precursor has open pores and a curved surface structure.

For example, the positive active material precursor of Formula 2 may be $Ni_{0.6}Co_{0.2}Mn_{0.2}OH$ or $Ni_{0.33}Co_{0.33}Mn_{0.33}OH$.

A second precursor solution including a nickel salt, a cobalt salt, and a manganese salt (step 140) and a second base are added to the precipitate, thereby obtaining a second mixture (step 150). The nickel salt, the cobalt salt, and the manganese salt are mixed at a molar ratio of x:y:z satisfying $0.05 \leq x \leq 0.9$, $0.1 \leq y \leq 0.8$, $0.1 \leq z \leq 0.8$, and $x+y+z=1$ so as to obtain the nickel-based composite oxide of Formula 1.

The pH of the second mixture is maintained basic and a second coprecipitation reaction in the second mixture is induced to obtain a composite metal hydroxide as a core part-shell part precursor (step 160).

The pH of the second mixture is adjusted to be approximately 11.5 to 12.0, and the reaction of the second mixture is performed at a temperature ranging from about 33 to about 50° C. In addition, a flow rate of $N_2$ is maintained at approximately 3 LPM, and an average reaction time is adjusted to be approximately 8 to 10 hours.

In the second mixture, the second base is added so as to adjust the pH of the second mixture within the range described above.

When the pH and reaction time of the first and second mixtures are within the ranges described above, a positive active material with a desired particle diameter and structure may be obtained.

The composite metal hydroxide is mixed with a lithium salt and the resultant mixture is heat treated to prepare a positive active material (step 170).

The heat treatment process is performed at a temperature ranging from about 800 about 1,000° C. in an air or oxidizing atmosphere.

The nickel salt may be a nickel sulfate, a nickel nitrate, a nickel acetate, a nickel halide, a nickel hydroxide, or a nickel oxyhydroxide. The cobalt salt may be a cobalt sulfate, a cobalt nitrate, a cobalt acetate, a cobalt halide, a cobalt hydroxide, or a cobalt oxyhydroxide. The manganese salt may be a manganese sulfate, a manganese nitrate, a manganese acetate, a manganese halide, a manganese hydroxide, or a manganese oxyhydroxide.

If the nickel salt, the cobalt salt, and the manganese salt are used in a solution state, a molar ratio of the solution may be in the range of about 5M (mol/L) to about 7M.

The lithium salt may be lithium carbonate ($Li_2CO_3$).

The base for the pH adjustment may be sodium hydroxide (NaOH), potassium hydroxide (KOH), lithium hydroxide (LiOH), or aqueous solutions thereof.

For example, an aqueous solution of the first base may have a concentration in the range of about 10 to about 14M, and an aqueous solution of the second base may have a concentration in the range of about 6 to about 12M.

When a first precursor solution and a second precursor solution are prepared using the nickel salt, the cobalt salt, and the manganese salt, distilled water may be used as a solvent.

In the preparation process described above, a reaction time of the second mixture used to obtain a composite metal hydroxide is longer than that of the first mixture. For example, the reaction time of the first mixture may be in the range of about 5 to about 7 hours, for example, approximately 6 hours, and the reaction time of the second mixture may be in the range of about 6 to about 10 hours, for example, approximately 10 hours. When the reaction time of the second mixture is longer than that of the first mixture, a positive active material with desired core and shell parts may be obtained.

Injection rates of the second precursor solution and the second base are lower than those of the first precursor solution and the first base.

For example, the injection rate of the first precursor solution may be in the range of about 600 to about 1,200 ml/h, and the injection rate of the first base may be in the range of about 400 to 800 ml/h.

For example, the injection rate of the second precursor solution may be in the range of about 300 to about 599 ml/h, and the injection rate of the second base may be in the range of about 200 to about 390 ml/h.

In the preparation process described above, the amounts of the nickel salt, the cobalt salt, and the manganese salt are stoichiometrically used so as to obtain the nickel-based composite oxide of Formula 1.

For example, in the preparation process of the precipitate, the amount of the nickel salt is in the range of about 1 to 1.2 moles, in particular, 1.1 moles based on 1 mole of the cobalt salt, and the amount of the manganese salt is in the range of about 1 to 1.2 moles, in particular, 1 mole based on 1 mole of the cobalt salt.

In the preparation process of the composite metal hydroxide, the amount of the nickel salt is in the range of about 1 to about 1.2 moles based on 1 mole of the cobalt salt, and the amount of the manganese salt is in the range of about 1 to about 1.2 moles based on 1 mole of the cobalt salt.

Detailed adjustment of reaction conditions in the aforementioned coprecipitation is known in the art, and thus, a detailed description thereof is not provided herein.

Figure 2:
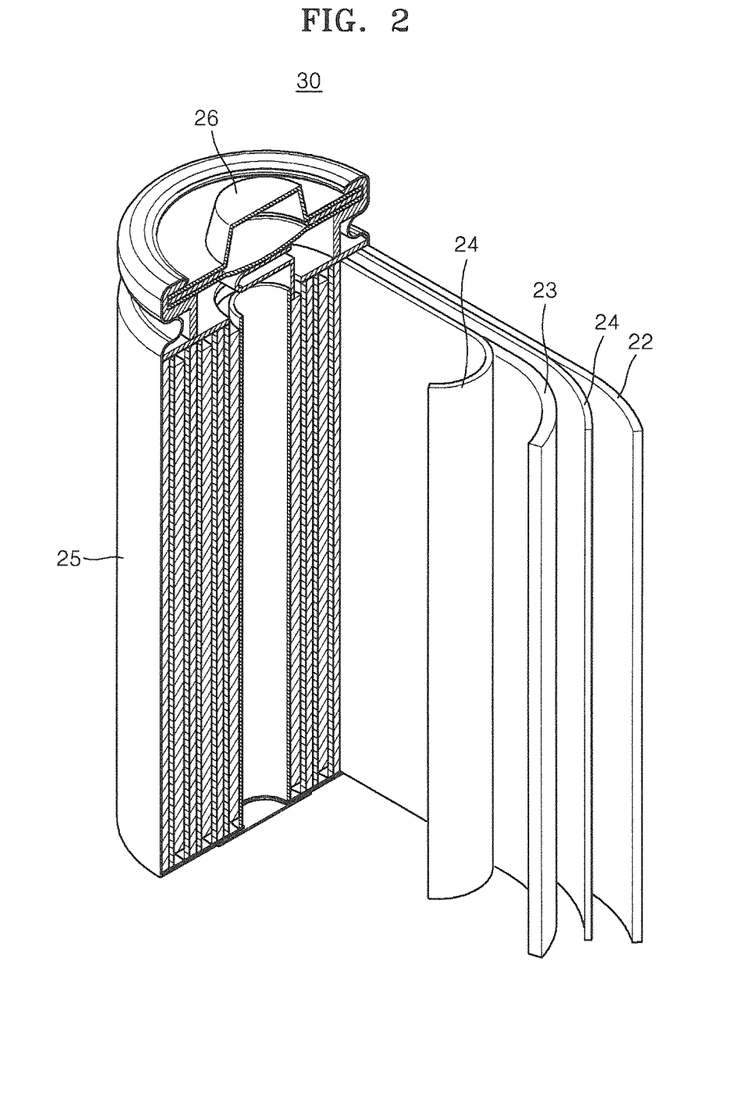
FIG. 2 is a schematic diagram illustrating a structure of a lithium secondary battery constructed as an embodiment according to the principles of the present invention.

FIG. 2 is a schematic diagram illustrating a structure of a lithium secondary battery 30 constructed as an embodiment according to the principles of the present invention. Referring to FIG. 2, the lithium secondary battery 30 mainly includes a positive electrode 23, a negative electrode 22, a separator 24 interposed between the positive electrode 23 and the negative electrode 22, an electrolyte (not shown) in which the positive electrode 23, the negative electrode 22, and the separator 24 are impregnated, a battery case 25, and a sealing member 26 that seals the battery case 25. The lithium secondary battery 30 may be configured such that the positive electrode 23, the negative electrode 22, and the separator 24 are sequentially stacked, wound in a spiral form, and accommodated in the battery case 25. In this regard, a positive active material of the positive electrode 23 is the positive active material having a two-layered structure as described with reference to FIG. 1.

One or more embodiments of the present invention will now be described in greater detail with reference to the following examples. However, these examples are for illustrative purposes only and are not intended to limit the scope of the invention.

Preparation Example 1

Preparation of Positive Active Material $Li_2CO_3$ was used as a Li salt, $NiSO_4$—$H_2O$ was used as a Ni salt, $CoSO_4$—$H_2O$ was used as a Co salt, and $MnSO_4$—$H_2O$ was used as a Mn salt.

In this regard, preparation processes for forming a hydroxide by coprecipitation were performed on the Ni sulfate, the Co sulfate, and the Mn sulfate. 0.6 moles of the Ni sulfate, 0.2 moles of the Co sulfate, and 0.2 moles of the Mn sulfate were dissolved in distilled water to obtain 2.5M of a first precursor solution. The first precursor solution was mixed with 4-8M of an aqueous sodium hydroxide solution and ammonia water at appropriate amounts, and the resultant mixture was stirred at 600 rpm in a thermostat at 25 to 35° C. to obtain a precipitate. In the coprecipitation reaction, pH was maintained in the range of 10-11, and an average reaction time of the resultant solution in the thermostat was adjusted to be about 5 to 7 hours. An injection rate of the first precursor solution was in the range of about 600 to about 1,200 ml/h, and injection rates of the aqueous sodium hydroxide solution and the ammonia water were in the range of about 400 to about 800 ml/h. In addition, a flow rate of $N_2$ was maintained at 1 LPM.

To the precipitate was added 2.5M of a second precursor solution obtained by dissolving 0.33 moles of the Ni sulfate, 0.33 moles of the Co sulfate, and 0.33 moles of the Mn sulfate in distilled, water, and the resultant solution was mixed with 4-8M of an aqueous sodium hydroxide solution and ammonia water at appropriate amounts and then stirred at 600 rpm in a thermostat at 35 to 50° C.

In the coprecipitation reaction, pH was maintained in the range of 11.5 to 12.0, and an average reaction time of the resultant solution in the thermostat was adjusted to be about 8 to 10 hours. An injection rate of the second precursor solution was in the range of about 300 to about 599 ml/h, and injection rates of the aqueous sodium hydroxide solution and the ammonia water were in the range of about 200 to about 390 mi/h. In addition, a flow rate of $N_2$ was maintained at 3 LPM.

The resultant coprecipitate, i.e., a composite metal hydroxide, was washed, dried, and then mixed with $Li_2CO_3$ at a molar ratio of 1:1, and the resultant mixture was heated up to 800 to 1,000° C. at a heating rate of 1-5° C./min in an air atmosphere and then heat treated at 800 to 1,000° C. for 5 to 20 hours. As a result, a positive active material that included a core part formed of $LiNi_{0.6}Co_{0.2}Mn_{0.2}O_2$ and a shell part formed of $LiNi_{0.33}Co_{0.33}Mn_{0.33}O_2$, and included needle-like particles was obtained.

Comparative Preparation Example 1

Preparation of Positive Active Material $Li_2CO_3$ was used as a Li salt, $NiSO_4$—$H_2O$ was used as a Ni salt, $CoSO_4$—$H_2O$ was used as a Co salt, and $MnSO_4$—$H_2O$ was used as a Mn salt. In this regard, preparation processes for forming a hydroxide by coprecipitation were performed on the Ni sulfate, the Co sulfate, and the Mn sulfate. 0.6 moles of the Ni sulfate, 0.2 moles of the Co sulfate, and 0.2 moles of the Mn sulfate were dissolved in distilled water to obtain 2.5M of a precursor solution. The precursor solution was mixed with 4-8M of an aqueous sodium hydroxide solution and ammonia water at appropriate amounts, and the resultant mixture was stirred at 600 rpm in a thermostat at 45° C.

In the coprecipitation reaction, pH was maintained in the range of 11 to 12, and an average reaction time of the resultant solution in the thermostat was adjusted to be 4 to 10 hours. The resultant coprecipitate was washed, dried, and then mixed with $Li_2CO_3$ at a molar ratio of 1:1, and the resultant mixture was heated up to 800 to 1,000° C. at a heating rate of 1-5° C./min in an air atmosphere and then heat treated at 800 to 1,000° C. for 5 to 20 hours to obtain $LiNi_{0.6}Co_{0.2}Mn_{0.2}O_2$.

Comparative Preparation Example 2

Preparation of Positive Active Material $Li_2CO_3$ was used as a Li salt, $NiSO_4$—$H_2O$ was used as a Ni salt, $CoSO_4$—$H_2O$ was used as a Co salt, and $MnSO_4$—$H_2O$ was used as a Mn salt. In this regard, preparation processes for a forming a hydroxide by coprecipitation were performed on the Ni sulfate, the Co sulfate, and the Mn sulfate.

0.33 moles of a Ni sulfate, 0.33 moles of a Co sulfate, and 0.33 moles of an Mn sulfate were dissolved in distilled water to obtain 2.5M of a precursor solution, the precursor solution was mixed with 4-8M of an aqueous sodium hydroxide solution and ammonia water at appropriate amounts, and the resultant mixture was stirred at 600 rpm in a thermostat at 45° C. In the coprecipitation reaction, pH was maintained in the range of 11 to 12, and an average reaction time of the resultant solution in the thermostat was adjusted to be 4 to 10 hours. The resultant coprecipitate was washed, dried, and then mixed with $Li_2CO_3$ at a molar ratio of 1:1, and the resultant mixture was heated up to 800 to 1,000° C. at a heating rate of 1-5° C./min in an air atmosphere and then heat treated at 800 to 1,000° C. for 5 to 20 hours to obtain $LiNi_{0.33}Co_{0.33}Mn_{0.33}O_2$.

Example 1

Manufacture of Lithium Secondary Battery 5.0 g of the positive active material prepared according to Preparation Example 1, 0.15 g of polyvinylidene fluoride, and 0.15 g of a carbon were dispersed in 2.5 g of methylpyrrolidone to prepare a positive electrode-forming composition.

The positive electrode-forming composition was coated on an aluminum (Al) foil to a thickness of 60 μm to form a thin plate, and the thin plate was dried at 135° C. for 3 hours or longer and pressed, thereby completing the preparation of a positive electrode.

Separately, a negative electrode was prepared as follows.

A carbonaceous negative active material and polyvinylidene fluoride as a binder were mixed at a weight ratio of 96:4 in N-methylpyrrolidone as a solvent to prepare a negative electrode slurry. The negative electrode slurry was coated on a Cu foil to thickness of 14 μm to form a thin plate, and the thin plate was dried at 135° C. for 3 hours or longer and pressed, thereby completing the preparation of a negative electrode.

An electrolyte was prepared by adding 1.3M $LiPF_6$ to a mixed solvent obtained by mixing ethylene carbonate (EC), ethyl methyl carbonate (EMC), and dimethyl carbonate (DMC) at a volume ratio of 1:1:1.

A separator consisting of a porous polyethylene (PE) film was interposed between the positive and negative electrodes prepared as above to form a battery assembly, the battery assembly was wound, pressed, and accommodated in a battery case, and the electrolyte was injected into the battery case, thereby completing the manufacture of a lithium secondary battery having a capacity of 2,600 mAh.

Comparative Example 1

Manufacture of Lithium Secondary Battery

A lithium secondary battery was manufactured in the same manner as in Example 1, except that the positive active material prepared according to Comparative Preparation Example 1 was used instead of the positive active material prepared according to Preparation Example 1.

Comparative Example 2

Manufacture of Lithium Secondary Battery

A lithium secondary battery was manufactured in the same manner as in Example 1, except that the positive active material prepared according to Comparative Preparation Example 2 was used instead of the positive active material of Preparation Example 1.

Evaluation Example 1

Inductively Coupled Plasma (ICP) Analysis

ICP analysis was performed on the positive active materials of Preparation Example 1 and Comparative Preparation Example 1, and the results are shown in Table 1 below.

TABLE 1

| | Nickel (Ni) (atomic %) | Cobalt (Co) (atomic %) | Manganese (Mn) (atomic %) |
|---|---|---|---|
| Preparation Example 1 | 51.2 | 24.9 | 24.8 |
| Comparative Preparation Example 1 | 60.1 | 20.0 | 19.9 |

Evaluation Example 2

Scanning Electron Microscope (SEM) Analysis

In Preparation Example 1, the coprecipitation reaction was performed using 2.5M of the first precursor solution for about 6 hours and the obtained resultant was washed and dried, thereby obtaining a core part precursor as a precipitate.

In addition, in Preparation Example 1, the coprecipitation reaction was performed using 2.5M of the second precursor solution for about 10 hours and the obtained resultant was washed and dried, thereby obtaining a core part-shell part precursor as a composite metal hydroxide.

Figure 3:
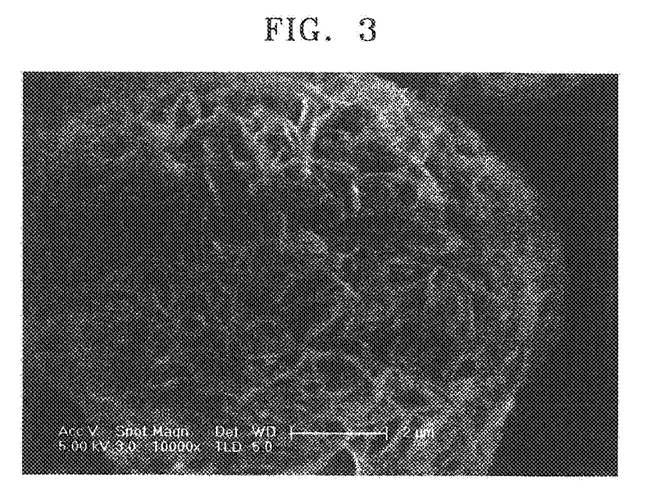
FIGS. 3 through 5 are scanning electron microscopic (SEM) images of a core precursor and a core-shell precursor prepared according to Preparation Example 1.
Figure 4:
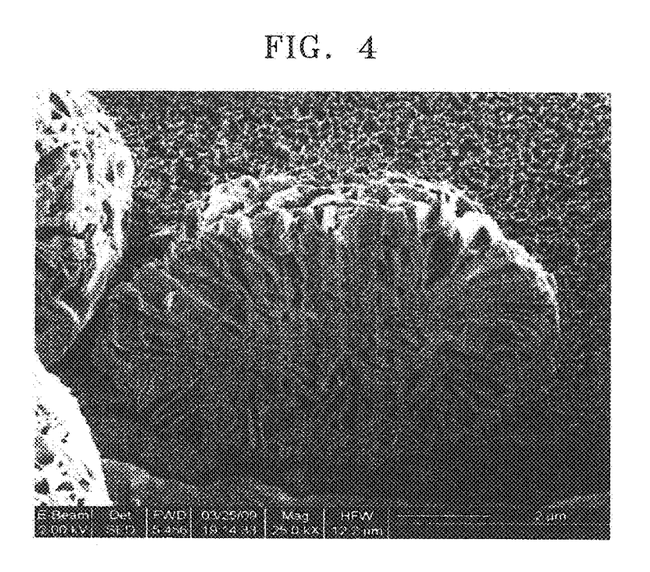
Figure 5:
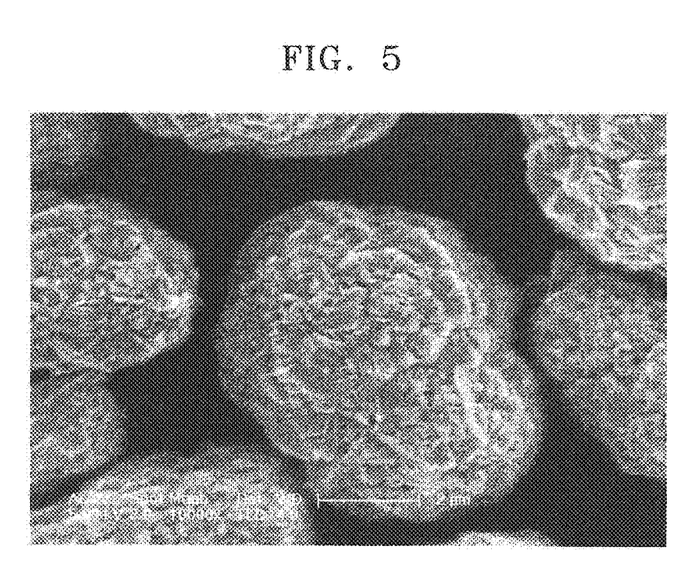

SEM analysis was performed on the core part precursor and the precursor of a core part-shell part precursor, and the results are illustrated in FIGS. 3 through 5. FIGS. 3 and 4 respectively illustrate SEM images showing a surface and a cross-section of the core part precursor, and FIG. 5 illustrates a SEM image showing a surface of the core part-shell part precursor.

As illustrated in FIGS. 3 and 4, it was confirmed that the core part precursor had open pores and a curved surface structure. As illustrated in FIG. 5, it was confirmed that the precursor of a core part-shell part composite was configured such that the open pores of the core part precursor illustrated in FIGS. 3 and 4 were filled during the formation of the shell part.

Evaluation Example 3

Thermal Stability

Figure 6:
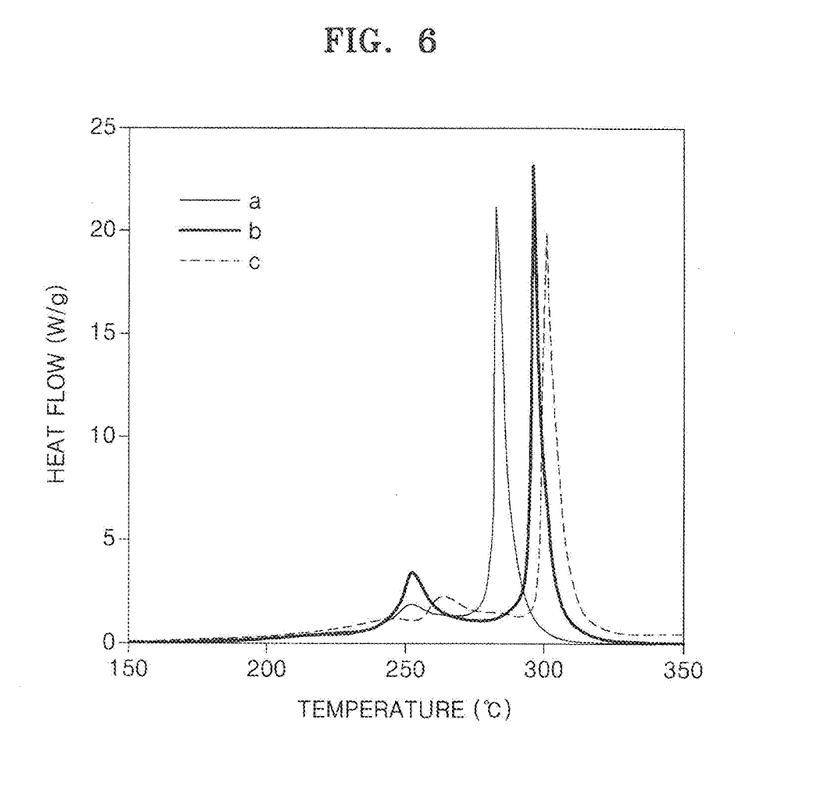
FIG. 6 is a graph showing differential scanning calorimetry results of positive active materials prepared according to Preparation Example 1, Comparative Preparation Example 1, and Comparative Preparation Example 2.

A thermal stability of the positive active material of Preparation Example 1 was measured using differential scanning calorimetry (DSC), and the results are illustrated in FIG. 6.

To evaluate the thermal stability of the positive active material of Preparation Example 1, FIG. 6 also illustrates DSC graphs showing thermal stabilities of the positive active materials of Comparative Preparation Examples 1 and 2. In FIG. 6, a denotes the positive active material of Comparative Preparation Example 1, b denotes the positive active material of Preparation Example 1, and c denotes the positive active material of Comparative Preparation Example 2.

As illustrated in FIG. 6, it was confirmed that the positive active material of Preparation Example 1 had a higher thermal stability than that of the positive active material of Comparative Preparation Example 1, and had a high thermal stability similar to that of the positive active material of Comparative Preparation Example 2.

Evaluation Example 4

Charge and Discharge Characteristics

The lithium secondary batteries manufactured according to Example 1 and Comparative Examples 1 and 2 were charged at a constant current of 16 mA/g until the voltage of the lithium secondary batteries reached 4.3 V (vs. Li). After the voltage reached 4.3 V, each lithium secondary battery was charged at a constant voltage of 4.3 V until the constant current value decreased to a tenth. Afterwards, each lithium secondary battery was discharged at a constant current of 16 mA/g (0.1 C rate) until the voltage of the battery reached 3 V (vs. Li), and the discharge capacity thereof was measured.

In a $2^{nd}$ cycle, each lithium secondary battery was charged at a constant current of 32 mA/g and a constant voltage of 4.3 V until the voltage of the battery reached 4.3 V (vs. Li). Thereafter, the lithium secondary battery was discharged at a constant current of 32 mA/g (0.2 C rate) until the voltage of the battery reached 3 V (vs. Li).

In a $3^{rd}$ cycle, each lithium secondary battery was charged at a constant current of 80 mA/g until the voltage of the lithium secondary battery reached 4.3 V (vs, Li). Thereafter, the lithium secondary battery was discharged at a constant current of 80 mA/g (0.5 C rate) until the voltage of the lithium secondary battery reached 3 V (vs. Li).

In a $4^{th}$ cycle, each lithium secondary battery was charged at a constant current of 160 mA/g until the voltage of the lithium secondary battery reached 4.3 V (vs. Li). Thereafter, the lithium secondary battery was discharged at a constant current of 160 mA/g (1 C rate) until the voltage of the lithium secondary battery reached 3 V (vs. Li).

The charge/discharge test was performed at 25° C.

The measurement results are shown in Table 2 below. An initial coulombic efficiency is represented by Equation 1 below. High-rate discharge characteristics are represented by as rate capability (1 C/0.1 C) of Equation 2 below:

Initial coulombic efficiency [%]=[discharge capacity in $1^{st}$ cycle/charge capacity in $1^{st}$ cycle]×100   Equation (1)

Rate capability [%]=[discharge capacity at 1 C rate ($4^{th}$ cycle)/discharge capacity at 0.1 C rate($1^{st}$ cycle)]×100   Equation (2)

TABLE 2

|  | Charge capacity at 0.1 C (mAh/g) | Discharge capacity at 0.1 C (mAh/g) | Efficiency [%] | Initial coulombic efficiency [%] | Rate capability [%] |
|---|---|---|---|---|---|
| Example 1 | 198.5 | 178.8 | 90.1 | 91.5 | 83.6 |
| Comparative Example 1 | 181.4 | 161.4 | 88.9 | 91.3 | 81.9 |
| Comparative Example 2 | 200.1 | 181.0 | 90.5 | 91.5 | 82.9 |

As shown in Table 2, the lithium secondary battery of Example 1 has higher initial coulombic efficiency and high rate characteristics (rate capability) than those of the lithium secondary batteries of Comparative Examples 1 and 2.

As described above, according to the one or more embodiments of the present invention, a positive active material for a lithium secondary battery consists of a nickel-based composite oxide and has a two layered-structure, an inner part of which has a large amount of nickel and an outer part of which has a small amount of nickel. Therefore, a lithium secondary battery including the positive active material may have hi capacity and improved stability.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A positive active material for a lithium secondary battery, the positive active material comprising:
   a core part comprising $LiNi_{0.6}Co_{0.2}Mn_{0.2}O_2$ and a shell part comprising $LiNi_{0.33}Co_{0.33}Mn_{0.33}O_2$ having a porous structure including a plurality of pores;
   wherein
   the core part comprises needle-like particles; and
   the shell part permeates into the open pores of the core part and fills the pores.

2. The positive active material of claim 1, wherein the core part or a core part precursor has a curved surface structure.

3. The positive active material of claim 1, wherein an amount of the core part is in a range of about 40 to about 90 parts by weight based on 100 parts by weight of the positive active material, and an amount of the shell part is in a range of about 10 to about 60 parts by weight based on 100 parts by weight of the positive active material.

4. The positive active material of claim 1, wherein a diameter of the core part is in a range of about 1 to about 10 μm, and a diameter of the shell part is in a range of about 5 to about 10 μm.

5. A method of preparing a positive active material of claim 1 for a lithium secondary battery, the method comprising:
   a first process for mixing a first precursor solution comprising a nickel salt, a cobalt salt, and a manganese salt and a base to prepare a first mixture and inducing a reaction in the first mixture to obtain a precipitate;
   a second process for adding to the precipitate a second precursor solution comprising a nickel salt, a cobalt salt, and a manganese salt and a base to obtain a second mixture and inducing a reaction in the second mixture to obtain a composite metal hydroxide; and
   mixing the composite metal hydroxide with a lithium salt and heat treating the mixed composite metal hydroxide to prepare the positive active material according to claim 1,
   wherein a content of nickel in the first precursor solution is adjusted to be larger than that in the second precursor solution.

6. The method of claim 5, wherein a reaction time of the second mixture in the second process is adjusted to be longer than that of the first mixture in the first process.

7. The method of claim 5, wherein a reaction time of the first mixture in the first process is in a range of about 5 to about 7 hours, and a reaction time of the second mixture in the second process is in a range of about 8 to about 10 hours.

8. The method of claim 5, wherein an amount of the nickel salt in the first process is in a range of about 1 to about 1.2 moles based on 1 mole of the cobalt salt.

9. The method of claim 5, wherein a pH of the first mixture in the first process is adjusted to be in a range of about 10 to about 11, and a pH of the second mixture in the second process is adjusted to be in a range of about 11.5 to about 12.0.

10. A lithium secondary battery comprising the positive active material according to claim 1.

* * * * *